(12) United States Patent
Sivaramalingam et al.

(10) Patent No.: US 11,399,208 B2
(45) Date of Patent: Jul. 26, 2022

(54) PACKET PRIORITY FOR VISUAL CONTENT

(71) Applicant: International Business Machines Corporation, Armonk, NY (US)

(72) Inventors: Balamurugaramanathan Sivaramalingam, Paramakudi (IN); Sathya Santhar, Chennai (IN); Samuel Mathew Jawaharlal, Chennai (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/581,063

(22) Filed: Sep. 24, 2019

(65) Prior Publication Data

US 2021/0092476 A1 Mar. 25, 2021

(51) Int. Cl.

| | |
|---|---|
| *G06F 15/16* | (2006.01) |
| *H04N 21/434* | (2011.01) |
| *H04N 21/44* | (2011.01) |
| *H04L 47/2416* | (2022.01) |
| *H04N 21/234* | (2011.01) |
| *H04N 21/236* | (2011.01) |
| *G06V 20/40* | (2022.01) |

(52) U.S. Cl.
CPC ......... *H04N 21/4343* (2013.01); *G06V 20/40* (2022.01); *H04L 47/2416* (2013.01); *H04N 21/23418* (2013.01); *H04N 21/23605* (2013.01); *H04N 21/44008* (2013.01); *G06V 2201/10* (2022.01)

(58) Field of Classification Search
CPC .......... H04N 21/4343; H04N 21/44008; H04L 47/2416; G06K 9/00711; G06K 2209/27
USPC ........ 709/219, 231, 217, 207; 370/235, 389; 345/522, 506
See application file for complete search history.

(56) References Cited

U.S. PATENT DOCUMENTS

| | | |
|---|---|---|
| 6,791,624 B1 | 9/2004 | Suga |
| 9,237,112 B2 | 1/2016 | Stanwood et al. |
| 9,858,559 B2 | 1/2018 | Raleigh et al. |
| 10,116,729 B2 | 10/2018 | Joe et al. |
| 10,341,241 B2 | 7/2019 | Su et al. |

(Continued)

OTHER PUBLICATIONS

May, K., "Eye-tracking shows where users are focused in search: on Google products," Dec. 13, 2013, 6 pgs. https://www.tnooz.com/article/google-eye-tracking-travel.

(Continued)

*Primary Examiner* — Thuong Nguyen
(74) *Attorney, Agent, or Firm* — Nolan M. Lawrence

(57) ABSTRACT

A video stream is obtained that includes at least one video stream image. The video stream is to be sent to one or more subscribers. Based on the obtaining the video stream, non-pixel data is retrieved. A first critical object in the video stream is determined. The determination is based on the obtaining the video stream and further based on the non-pixel data. The first critical object is represented by a first plurality of pixels. The first plurality of pixels is located within the at least one video stream image. A first prioritization of one or more network packets of the video stream is generated. The one or more network packets contain the first plurality of pixels. The first prioritization is generated based on determining the first critical object in the video stream.

18 Claims, 5 Drawing Sheets

(56) References Cited

U.S. PATENT DOCUMENTS

| | | | | |
|---|---|---|---|---|
| 2004/0160960 | A1* | 8/2004 | Monta | H04N 19/436 370/395.4 |
| 2010/0110200 | A1* | 5/2010 | Lau | H04N 21/44222 348/207.1 |
| 2010/0271485 | A1* | 10/2010 | Kim | H04N 5/232945 348/169 |
| 2010/0332497 | A1* | 12/2010 | Valliani | G06F 16/70 707/759 |
| 2011/0049374 | A1* | 3/2011 | Omi | G09G 3/006 250/370.08 |
| 2011/0106964 | A1* | 5/2011 | Bennett | H04N 21/4622 709/231 |
| 2011/0240740 | A1* | 10/2011 | Li | G06K 7/1447 235/462.09 |
| 2012/0054302 | A1* | 3/2012 | Priyadarshan | G06Q 30/02 709/217 |
| 2012/0062732 | A1* | 3/2012 | Marman | G08B 13/19682 348/142 |
| 2012/0102131 | A1* | 4/2012 | Lin | H04L 65/4076 709/207 |
| 2013/0021428 | A1* | 1/2013 | Byers | G06F 3/1446 348/14.07 |
| 2013/0117772 | A1* | 5/2013 | Sugiyama | H04N 21/44204 725/14 |
| 2013/0287023 | A1* | 10/2013 | Bims | H04L 1/0018 370/389 |
| 2014/0204100 | A1* | 7/2014 | Holland | G06T 1/20 345/522 |
| 2015/0009349 | A1* | 1/2015 | Kim | H04N 5/23229 348/218.1 |
| 2015/0134673 | A1* | 5/2015 | Golan | G06F 16/739 707/748 |
| 2015/0302544 | A1* | 10/2015 | Chen | G09G 5/001 345/506 |
| 2015/0367238 | A1* | 12/2015 | Perrin | A63F 13/30 463/29 |
| 2016/0041998 | A1* | 2/2016 | Hall | G06F 16/7867 707/725 |
| 2017/0026720 | A1* | 1/2017 | Nadler | H04N 21/4725 |
| 2017/0076142 | A1* | 3/2017 | Chang | G06K 9/627 |
| 2017/0083929 | A1* | 3/2017 | Bates | G06Q 10/067 |
| 2017/0206693 | A1* | 7/2017 | Sharma | G09B 19/0038 |
| 2018/0082339 | A1* | 3/2018 | Herman | G06Q 30/0276 |
| 2019/0075367 | A1* | 3/2019 | van Zessen | H04N 21/4826 |
| 2019/0199763 | A1* | 6/2019 | Demirli | H04L 65/602 |
| 2020/0192700 | A1* | 6/2020 | Maniyar | G06F 3/0482 |

OTHER PUBLICATIONS

Moreira et al., Real-time Object Tracking in High-Definition Video Using Frame Segmentation and Background Integral Images, SIBGRAPI '13: Conference on Graphics, Patterns and Images, 2013, 8 pgs. http://www.ucsp.edu.pe/sibgrapi2013/eproceedings/technical/114940_2.pdf.

Brostow et al., "Semantic Object Classes in Video: A High-Definition Ground Truth Database," Computer Vision Group, University of Cambridge, Oct. 1, 2007, 21 pgs.

Kim et al., "Detecting Regions of Interest in Dynamic Scenes with Camera Motions," To Appear in Proceedings of IEEE Conference on Computer Vision and Pattern Recognition (CVPR), Jun. 2012, 8 pgs. www.kihwan23.com/papers/CVPR2012/gp_roi.pdf.

Part 5—Special Access Services—Common, Section 4—AT&T Switched Ethernet Service, Oct. 25, 2014, 37 pgs. cpr.att.com/pdf/is/0005-0004.pdf.

Mu et al. "Visibility of individual packet loss on H.264 encoded video stream—A user study on impact of packet loss on perceived video quality," In Proc. 16th ACM/SPIE Multimedia Computing and Networking Conference (MMCN), 2009, 12 pgs, www.eecs.qmul.ac.uk/~tysong/files/MMCN09-QoE.pdf.

Kao et al., "An Advanced Simulation Tool-set for Video Transmission Performance Evaluation," Article, Jan. 2006, 9 pgs., DOI: 10.1145/1190455.1190464 https://www.researchgate.net/publication/234777701_An_advanced_simulation_tool-set_for_video_transmission_performance_evaluation.

* cited by examiner

PACKET PRIORITY FOR VISUAL CONTENT

BACKGROUND

The present disclosure relates to network packets, and more specifically, to setting a priority for packets based on content contained within visual data.

Network service providers may operate by assigning a class of service or cost of service to network traffic. Network traffic may include one or more network packets representative of various applications, such as email, messages, audio, and video. Video may consume a large amount of network bandwidth. It may be preferable for video to operate without the objects depicted in the video or other content of the video to be lost due to bandwidth limitations.

SUMMARY

According to some embodiments, disclosed are a method, system, and computer program product. A video stream is obtained that includes at least one video stream image. The video stream is to be sent to one or more subscribers. Based on the obtaining the video stream, non-pixel data is retrieved. A first critical object in the video stream is determined. The determination is based on the obtaining the video stream and further based on the non-pixel data. The first critical object is represented by a first plurality of pixels. The first plurality of pixels is located within the at least one video stream image. A first prioritization of one or more network packets of the video stream is generated. The one or more network packets contain the first plurality of pixels. The first prioritization is generated based on determining the first critical object in the video stream.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
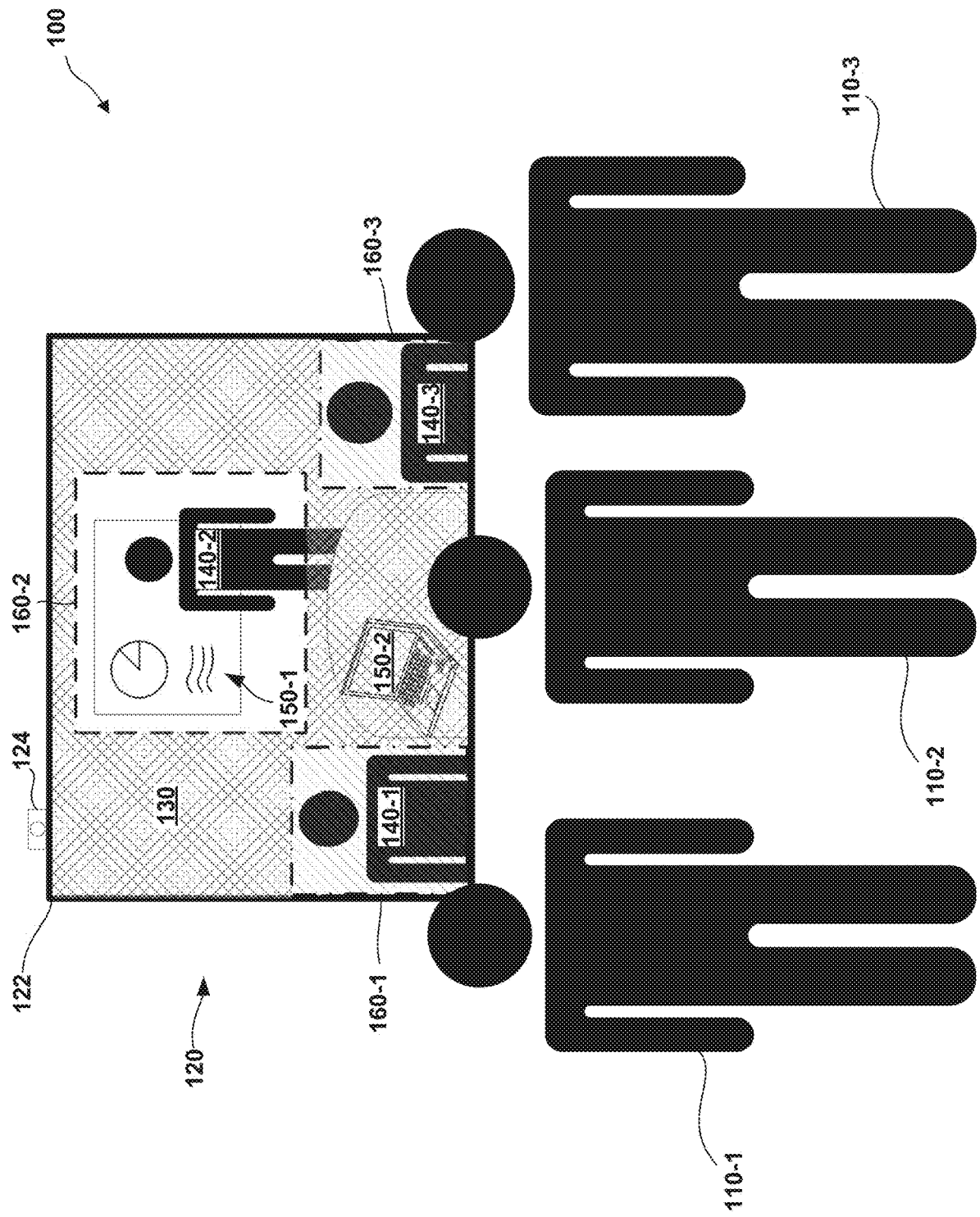
FIG. 1 depicts an example environment operating with a content aware class of service consistent with some embodiments of the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to network packets; more particular aspects relate to setting a priority for packets based on content contained within visual data. While the present disclosure is not necessarily limited to such applications, various aspects of the disclosure may be appreciated through a discussion of various examples using this context.

Service providers may operate to provide network services to various users (e.g., telecom services, video services, network streaming services, network server access services). Service providers may offer various class of service (COS) (alternatively, cost of service) options to end users (users) in order to manage multiple traffic profiles over a network. For example, class of service may operate through a service provider by giving certain types of network traffic (traffic) priority over others. Network traffic may include a plurality of network packets (or other relevant elements of a stream of data of a network that is unitized into smaller elements). When a network experiences congestion or delay, network packets (packets) with higher COS values may be prioritized to attempt to avoid random loss of data.

Packet prioritization may be achieved by dividing similar types of traffic, such as e-mail, streaming video, voice, and large document file transfer into various class of service groups (alternatively, options). Packet prioritization may further apply different levels of priority based on various factors. For example, factors used for packet prioritization may include one or more of the following: throughput, packet loss, network delay, price, user service agreement, and network topology. The factors may be used to select a different prioritization scheme for each group of network traffic.

Service providers may enable users of the network to set their own COS (user-defined COS). For example, service providers may currently allow users to associate different combinations of COS values at various levels. Various levels include, COS association at network device level (customer or provider edge router), COS association at a physical/virtual channel level, COS association at data packet level, and COS association at application level.

Leveraging a user-defined COS may be implemented for video streams. For example, a video stream may be a specific video/image handling application (e.g., video chat, video conferencing). In another example, a video stream may be web-based video streaming (e.g., a game streaming application, a video streaming website, a movie or television series streaming service). If a user has subscribed for a high priority COS profile for video streams, a service provider may ensure that the communication channel supports the features of the subscribed COS profile (e.g., 0% packet loss, minimal delay). For example, by prioritizing data packets associated with an application or web-based service.

A downside to this design, however, is that not all portions of a video stream are of equal importance. For example, there could be a certain portion of the images that make up a given video stream (video stream images) in which the end user is most interested. In another example, there could be a certain portion of video stream images and video streams in which the end user is least interested. Regardless of the interest of a user, application level, file-type level, or service level COS may be too coarse to be useful in providing the network traffic to the user. The user ends up paying high cost associated with the high priority COS profile as it is subscribed at application level, file-type level, or web page/service level.

For example, a user may have a high COS profile subscribed for video conferencing application to ensure that the data packets associated with the video conference would be provided at very high priority. While the video conference is in progress, interest of the user is mostly focused on a second user on the other end. Apart from the second user, many other objects in the background may be visible over the video conference (e.g., a fan running on the background or a furniture in the background); the other objects may be of no interest to the user. In another example, there could a portion of a video stream that contains the actual content of the video stream images and a remaining portion of the video stream that contains no information, irrelevant information, or no context for video stream images. But as the user subscribed for a high COS profile for certain applications and web sites, all the pixels of the any image or video would be highly prioritized. Consequently, all the pixels would consume the network bandwidth on high priority. These technical peculiarities may be contradictory to how a user may prefer to receive network traffic. In this case, there is minimal benefit for the end user to pay and subscribe for the high COS profile for the entire video/image handling application/web page.

Similarly, service providers may be forced to maintain costly infrastructure and services to provide adequate bandwidth for current COS profiles of users. For example, if multiple users subscribe to the service provider, each user may have COS profiles for video data that are of a high COS profile. To provide packet delivery that fulfills the COS profiles of many users, a service provider may have to invest into multiple lines of network cabling. In some instances, a service provider may have to purchase, operate, and maintain networking equipment (e.g., switches, routers) that provides increased throughput.

Additionally, network traffic may not be evenly distributed throughout a day. For example, some hours of the day may be work hours. During work hours, many (e.g., dozens, thousands) of end users may simultaneously perform teleconferencing with real-time video packets. In another example, some hours of the day may be leisure hours. During leisure hours, many (e.g., hundreds, millions) of end users may simultaneously perform video streaming from content providers including video streams of high resolution or definition. These costly use cases may cause video streams to be provided with degradation. Degradation may be smearing, pausing, stuttering, jittering, macro blocking, missing data, periodic outages, or other relevant video artifacts in the video stream images that make up a video stream. The degradation of the video stream may be of the content or context of a video. For example, a video stream may include one or more objects, subjects, or other features of importance that may be degraded, as a result of certain packets being delayed or lost in certain network traffic.

A content aware class of service (CACOS) may provide benefits over existing methods of packet delivery in a network. A CACOS may operate at a pixel or object level to flag, identify, or otherwise group content within a video stream. A CACOS may allow for a user to pay for network COS at an object or pixel level and may save users certain costs while also increasing the likelihood of service fulfillment. A CACOS may enable service providers to provide more meaningful data delivery and network throughput for an increased number of users given a fixed amount of network infrastructure and bandwidth. A CACOS may allow a user to provide differing levels of priority for various objects at a pixel level of context. Practically, a CACOS may be implemented to allow a user or a network provider to dynamically define various levels of COS profiles at the pixel level. A CACOS may operate based on image content analysis. A CACOS may operate based on points of interest of an end user. A CACOS may allow a provider to successfully provide video streams and video stream images to users without delivering the entirety of the pixel values. For example, only delivering a subset of pixels of a given video image through a video stream.

A CACOS may operate without changing the bit-rate of a video stream. As the bit rate of the video stream is not changed at the sender or receiver side, a CACOS may ensure the entire video content would be delivered in a desired quality when there is no network congestion. In the alternative, a CACOS may deliver a video stream with full definition for critical sections only. This may reduce storage costs by requiring a content provider to only store one full resolution version of a video stream, and not store lower resolution versions as only critical portions may be delivered in times of bandwidth constraints. A CACOS may, in case of network congestion, ensure that packets that are delivered will be delivered at a high priority and at a full bit-rate. Consequently, an advantage of CACOS is that portions of the video stream that are delivered may be rendered with full quality or without any degradation, jitter, or latency issues.

In some embodiments, a default setting for users of a CACOS may include using object or pixel-based class of service packet assignment or, alternatively, users can allow all packets a similar COS assignment. Based on the type of the application, the area of interest might differ. For example, when someone is talking over a video chat, pixels that represent a human may be prioritized when compared to a background. In another example, during a football match, the green ground surface may be less prioritized. During transmission, and consequently receipt, of a video stream, a recipient user may feel that the entire image is of equal importance or that less prioritized pixels are more important; in these situations, the recipient user can switch over to normal application-based COS transmission and reception.

A CACOS may provide a subscriber user (subscriber) with the ability to receive higher quality video even with a lower COS profile. For example, a user may subscribe to a medium or low priority COS profile for an application and would not expect data packets from the network to avoid latency, jitter, packet loss when the network faces congestion. When the user subscribes for a medium or low priority COS profile, images may be delivered without degradation during times of no network issue. During times of network issues (e.g., network congestion), images could be delivered with loss of data packets or packet delivery beyond threshold delay period for only irrelevant portions of the images (e.g., pixels that are not of context or interest to a user).

FIG. 1 depicts an example environment 100 operating with a content aware class of service consistent with some embodiments of the disclosure. Example environment 100 may be an office setting including a plurality of local workers 110-1, 110-2, and 110-3 (collectively, 110). The office setting 100 may also include a teleconferencing device 120 for facilitating a teleconference. The teleconferencing device 120 may include a display 122 configured to render a video stream 130 (e.g., a teleconference). The teleconferencing device 120 may also include a camera 124 configured to capture the local workers 110. Teleconferencing device 120 may be configured to operate using a content or context aware compressor/decompressor interface, media player, or other application operable to receive a video in the form of packets sent from a CACOS system.

Teleconferencing device 120 may not wait for all packets of a given video stream 130 to be received before displaying the video stream images of the video stream. Teleconferencing device 120 may execute a video handling application that can receive video stream packets of various COS (e.g., high COS packets, low COS packets, default COS packets). The stream of packets can be either displayed or ignored. For example, certain packets that are not received within a specific time interval can be discarded as lost packets and other packets containing critical pixels of the video stream 130 can be used to display the content. Teleconferencing device 120 may incorporate jitter handling buffer properties and decodable threshold values for a specific video handling application.

The video stream 130 may display one or more remote workers 140-1, 140-2, and 140-3 (collectively 140) and one or more inanimate objects 150-1 and 150-2 (collectively 150). Another computing system (not depicted) may analyze the video stream 130 and determine features and objects within the video stream. The determined objects may include the remote works 140 and the inanimate objects 150. The other computer system may use object or feature detection or other relevant visual analysis algorithms to detect subjects, features, objects, or other characteristics to identify the determined objects. The other computer system may dynamically identify critical areas 160-1, 160-2, 160-3 (collectively 160) of the video stream 130. In some embodiments, the identification and adjustment of critical areas within the video stream 130 may change as the video changes. For example, a first video stream image of the video stream 130 may include a critical area in a first area at a first time. Then prediction and tracking of objects by performing object analysis may identify a second area for a second video stream image of the video stream 130 as a new critical area.

In some embodiments, the dynamic identification may be based on input from the local workers 110. For example, local worker 110-2 may be given identification of the critical areas 160 of the video stream 130. The local worker 110-2 may select critical area 160-2 and input the selection to teleconferencing device 120. Teleconferencing device 120 may transmit the selection to the other computer system that hosts the video stream. The other computer system may assign packets associated with pixels that represent the critical area 160-2 a higher COS. If network issues occur, teleconferencing device 120 may receive the pixels from crucial area 160-2 before other pixels of the image.

In some embodiments, multiple critical areas 160 may be assigned different COS values in accordance with CACOS techniques. For example, another computer may perform an analysis to detect that a remote worker 140-2 is moving and making noise, such as pointing at the whiteboard 150-1 and speaking. Based on analysis by the other computer, critical area 160-2 may be deemed most critical. On further analysis, remote workers 140-1 and 140-3 may be identified as humans within the video stream 130. Based on this identification, critical areas 160-1 and 160-3 may be marked as being critical, but not as critical as critical area 160-2. Consequently, pixels corresponding to critical areas 160-1 and 160-3 may be inserted into packets and may be assigned a higher COS value than other pixels in video stream 130. Further, pixels corresponding to critical area 160-2 may be inserted into packets and may be assigned a higher COS value than packets containing pixels of critical areas 160-1 and 160-3.

Certain image/video processing applications executed by teleconferencing device 120 may be equipped with a playout buffer or de-jitter buffer that can be configured to wait for a specific number of packets to be received before displaying the video stream images of a video stream (e.g., transferring the latency/jitter as buffer delay). The image/video processing application can be further programmed to wait for a specific time interval to discard packets as lost packets and display the video stream image content using only the received packets. By utilizing one or more of these configurations, the display 122 of teleconferencing device 120 may display teleconference 130 by discarding packets after expiration of a predefined time interval and rendering pixels received of a higher priority without any latency or jitter.

A video stream image may be a video frame, field, or other relevant picture. A video stream image may contain a certain number of pixels or blocks (e.g., 921,600 pixels, 307,200 pixels, blocks, macroblocks). A video stream image may be separated into packets (e.g., a packet per block, a packet per 3,000 pixels, a packet per 328 pixels). A video stream image may be considered as a decodable video stream image if at least a fixed fraction of the packets in the video stream image are received, which is called as decodable threshold (DT). For example, when DT=1.0, the decoder may be completely intolerant to any packet losses and so one packet lost is enough to lead to an undecodable video stream image. In another example, when DT=0.75, the video stream image may still be considered decodable if there are 25% of the packets from a video stream image lost. Packets may be lost due to network bandwidth constraints or other network-infrastructure-related losses or delay in receipt of packets. The DT value can be customized in the teleconferencing device 120 to support displaying the video stream 130 with packets containing critical pixels instead of waiting for all the packets to be received. The DT may be set at an application level metric, which can be configured in such a way that the desired quality of the overall video stream 130 is maintained.

Consequently, portions of the video stream 130 that are not a critical area 160 may be blurred, have artifacts, or other degraded quality (represented by crosshatching in FIG. 1). Further, portions of the teleconference 130 may include only slight degraded quality (e.g., the single-lining representation within critical areas 160-1 and 160-3 in FIG. 1). Further, critical area 160 may be displayed without any degradation or with only minor or slight degradation in comparison with the rest of video stream 130.

Figure 2A:
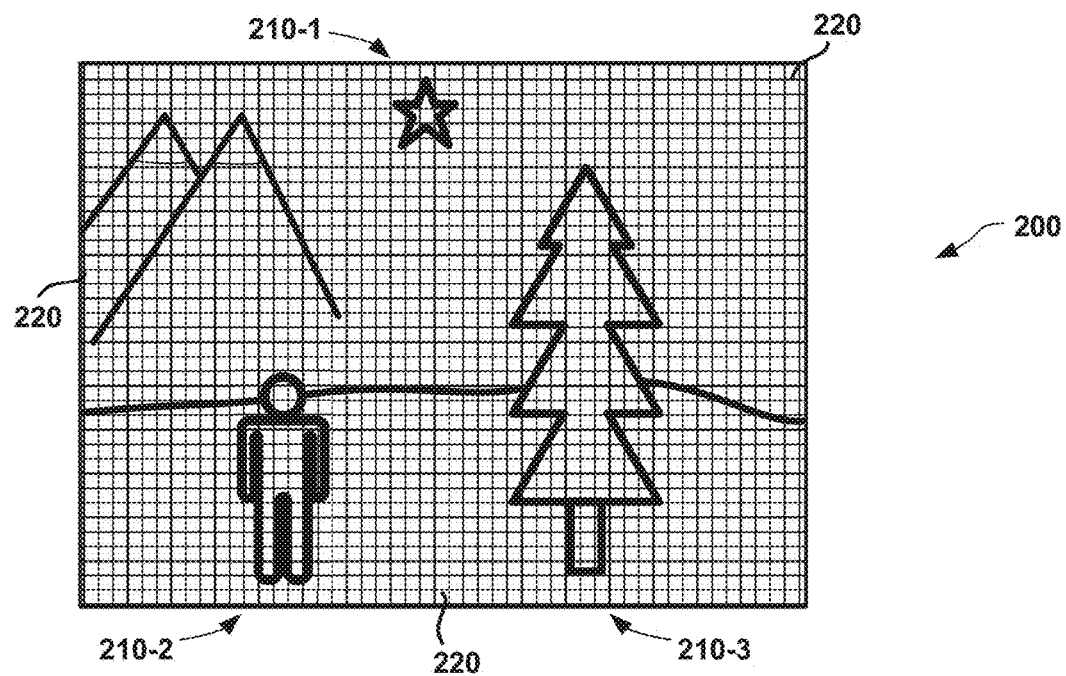
FIG. 2A depicts an example video stream analyzed with a content aware class of service consistent with some embodiments of the disclosure.

FIG. 2A depicts an example video stream 200 analyzed with a content aware class of service consistent with some embodiments of the disclosure. Video stream 200 may be a video stream image of a larger video (e.g., a movie, a teleconference, a video recording, a television show). Each video stream image of video stream 200 may include a plurality of pixels 220.

The plurality of pixels 220 may represent various features, objects, subjects or other elements. The video stream 200 may include one or more objects 210-1, 210-2, and 210-3 (collectively 210) that contain information and context for users that may consume (e.g., watch) the video stream. For example, objects 210 may include the following: object 210-1 may be a celestial body within the sky of a video stream image; object 210-2 may be an actor within the video stream image; and object 210-3 may be a tree within the video stream image. Various subsets (e.g., one or more pixels) of the plurality of pixels 220 may represent each object 210 within the video stream 200.

Figure 2B:
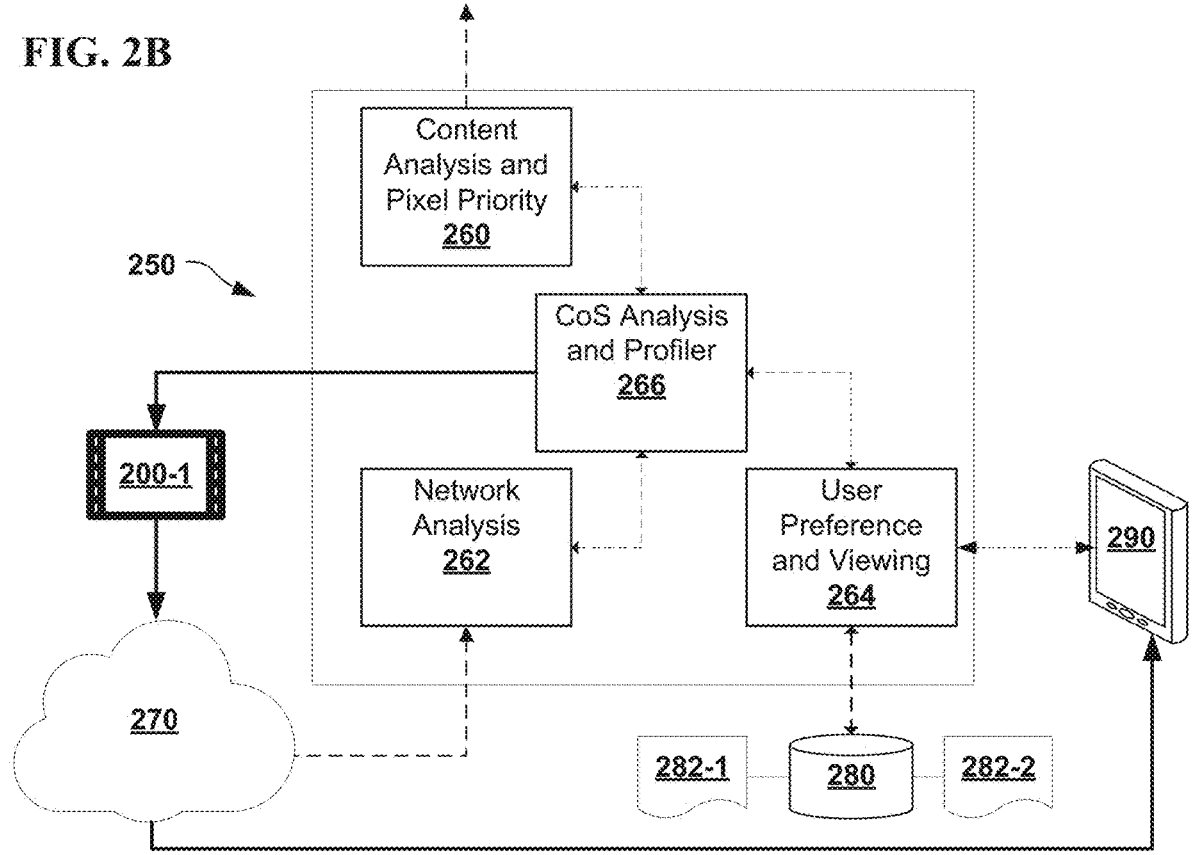
FIG. 2B depicts an example content aware class of service system, consistent with some embodiments of the disclosure.

FIG. 2B depicts an example content aware class of service system 250, consistent with some embodiments of the disclosure. The CACOS system 250 may include the following: an image content analysis and pixel priority (CAPP) module 260; a network analysis module 262, a user preference and viewing (UPAV) module 264; and a COS analysis and profiler (CAP) module 266. The CACOS system 250 may be a cognitive management system by which inferences and preferences of various users as well as subjects rendered within pixels of a video stream (e.g., video stream 200) may be detected and determined. For example, the system may be capable of dynamically changing the COS profile at pixel level based on the image content analysis or based on the point of interest of one or more users. The CACOS system 250 may perform dynamic configuration of class of service profiling of packets at object level within video streams and in turn at the pixel level. The CACOS system 250 may operate based on image content analysis, user preference analysis, communication channel/network-based constraints, or some combination thereof.

Figure 5:
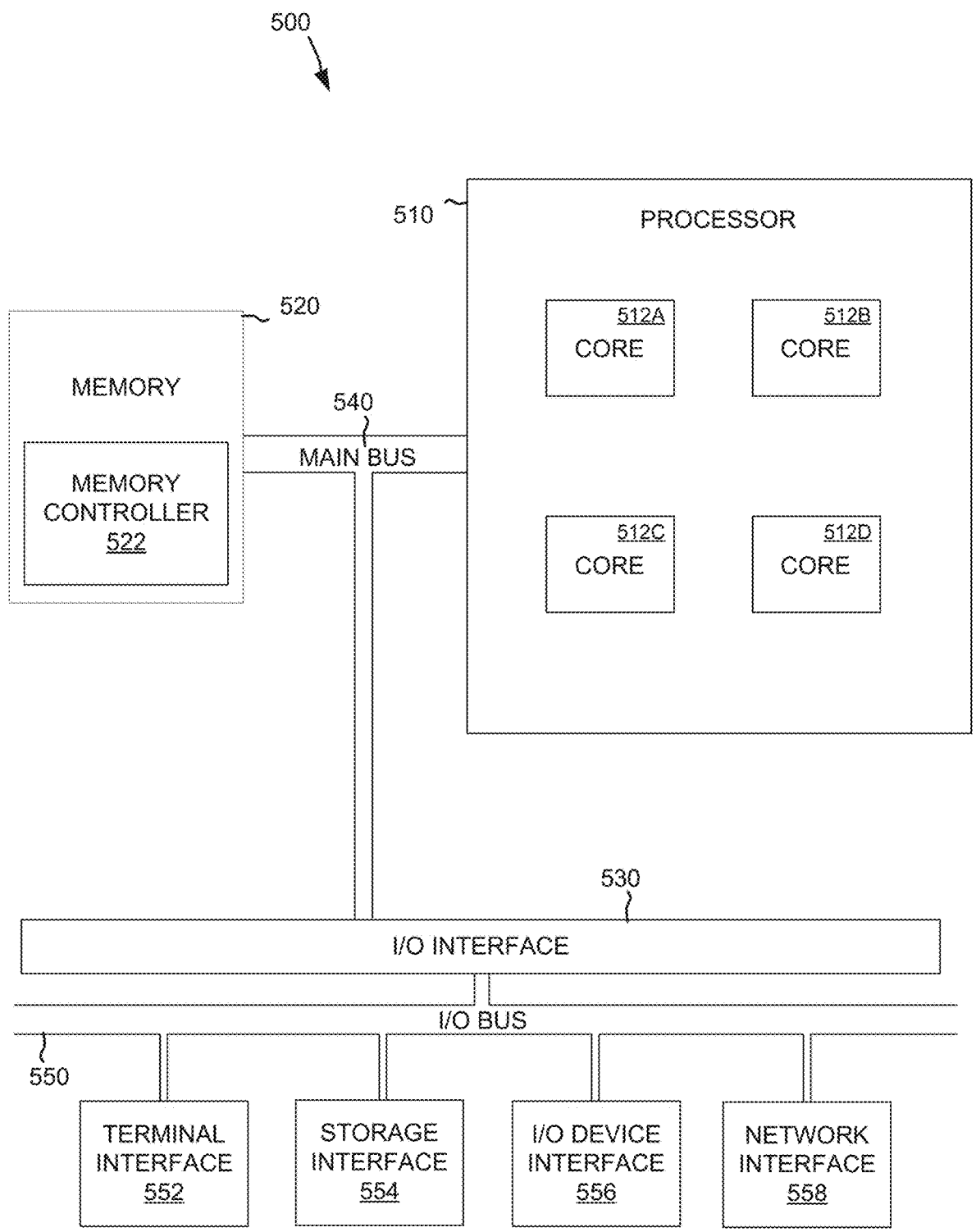
FIG. 5 depicts the representative major components of an example computer system that may be used, in accordance with some embodiments of the present disclosure.

The CAPP module 260 may be software, hardware, or some combination running on circuits of one or more computers. For example, FIG. 5 depicts an example computer system 500 consistent with some embodiments, capable of implementing CAPP module 260. The CAPP module 260 may be configured to obtain and analyze each picture (frame or field) of a video stream (video stream image), such as video stream 200. Based on analysis CAPP module 260 may identify the portion of the video stream image (e.g., pixels 220) which would represent the actual information or context of the video stream image and rate the pixels associated with that portion of the video stream image. For example, by rating certain portions or pixels with a scale of one to five from least critical to most critical pixels. CAPP module 260 may communicate to CAP module 266 with the prioritized pixel details. The object detection and identification and criticality association can be static or can be done at run time. The CAPP module 260 may be run prior to providing a video stream to users.

The CAPP module 260 may be configured to perform various image analysis techniques. The image analysis techniques may be machine learning and/or deep learning based techniques. These techniques may include, but are not limited to, region-based convolutional neural networks (R-CNN), you only look once (YOLO), edge matching, clustering, grayscale matching, gradient matching, invariance models, geometric hashing, scale-invariant feature transform (SIFT), speeded up robust feature (SURF), histogram of oriented gradients (HOG) features, and single shot multibox detector (SSD). In some embodiments, the CAPP module 260 may be configured to aid in identifying a face (e.g., by analyzing images of faces using a model built on training data).

In some embodiments, objects may be identified using an object detection algorithm, such as an R-CNN, YOLO, SSD, SIFT, Hog features, or other machine learning and/or deep learning object detection algorithms. The output of the object detection algorithm may include one or more identities of one or more respective objects with corresponding match certainties. This may occur, for example, by analyzing a teleconferencing scene that includes a person, wherein a relevant object detection algorithm is used to identify the person.

In some embodiments, features of the objects may be determined using a supervised machine learning model built using training data. For example, an image may be input into the supervised machine learning model and various classifications detected within the image can be output by the model. For example, characteristics such as object material (e.g., cloth, metal, plastic, etc.), shape, size, color, and other characteristics may be output by the supervised machine learning model. Further, the identification of objects (e.g., an ear, a nose, an eye, a mouth, etc.) can be output as classifications determined by the supervised machine learning model. For example, if a user inputs an image of a vehicle, a supervised machine learning algorithm may be configured to output an identity of the object (e.g., automobile) as well as various characteristics of the vehicle (e.g., the model, make, color, etc.).

In some embodiments, characteristics of objects may be determined using photogrammetry techniques. For example, shapes and dimensions of objects may be approximated using photogrammetry techniques. As an example, if a user provides an image of a basket, the diameter, depth, thickness, etc. of the basket may be approximated using photogrammetry techniques. In some embodiments, characteristics of objects may be identified by referencing an ontology. For example, if an object is identified (e.g., using an R-CNN), the identity of the object may be referenced within an ontology to determine corresponding attributes of the object. The ontology may indicate attributes such as color, size, shape, use, etc. of the object.

Characteristics may include the shapes of objects, dimensions (e.g., height, length, and width) of objects, a number of objects (e.g., two eyes), colors of object, and/or other attributes of objects. In some embodiments, an output list including the identity and/or characteristics of objects (e.g., cotton shirt, metal glasses, etc.) may be generated. In some embodiments, the output may include an indication that an identity or characteristic of an object is unknown. In these instances, additional input data may be requested to be analyzed such that the identity and/or characteristics of objects may be ascertained. For example, the user may be prompted to provide features of the face such that objects in their surrounding may be recognized. In some embodiments, various objects, object attributes, and relationships between objects (e.g., hierarchical and direct relations) may be represented within a knowledge graph (KG) structure. Objects may be matched to other objects based on shared characteristics (e.g., skin-tone of a cheek of a person and skin-tone of a chin of a person), relationships with other objects (e.g., an eye belongs to a face), or objects belonging to the same class (e.g., an identified eye matches a category of eyes).

In some embodiments, the identification of critical areas within a given video stream may change or be adjusted as the content of a video stream changes. For example, areas of interest in motion video of dynamic scenes with multiple moving objects may be detected. The detection may include extracting a global motion tendency that reflects the scene context by tracking movements of objects in the scene. Relevant technics may be applied to define and capture the motion outside of a pixel level. For example, the use of a Gaussian process regression may be used to represent the extracted motion tendency as a stochastic vector field. The generated stochastic field may be robust to noise and can handle a video from an uncalibrated moving camera. The stochastic field may be referred to in future video stream images of a video stream for predicting important future regions of interest as the scene within the video stream changes (e.g., characters moving, cameras panning).

The network analysis module 262 may be software, hardware, or some combination running on circuits of one or more computers. For example, FIG. 5 depicts an example computer system 500 consistent with some embodiments, that can execute network analysis module 262. Network analysis module 262 may be configured to collect network performance, based on various relevant network attributes and may operate in real-time. Network analysis module 262 may operate by monitoring traffic, receiving broadcast streams, inspecting packets, and receiving diagnosis and system level packets from one or more network hardware or devices (e.g., routers, switches, bridges). Network analysis module 262 may provide input to the CAP module 266.

The UPAV module 264 may be software, hardware, or some combination running on circuits of one or more computers. For example, FIG. 5 depicts an example computer system 500 consistent with some embodiments, that can execute UPAV module 264. The UPAV module 264 may be configured to retrieve and analyze non-pixel data. For example, non-pixel data may be the historic and real-time viewing preferences of various users that subscribe to videos (e.g., subscribers). In another example, the non-pixel data may be the result of analysis of video streams by the CAPP module 260. The UPAV module 264 may be configured to store the non-pixel data within a data store 280. Data store 280 may be a database, secondary memory, tertiary memory, or other relevant technology for storing records.

Data store 280 may include one or more subscriber profiles 282-1 and 282-2 (collectively 282) that correspond to various users of the CACOS 250. The subscriber profiles 282 may include determinations made by the UPAV module 264 and based on a given subscriber's viewing history. For example, if a subscriber watches a lot of sports, then one or more of the subscriber profiles 282 related to the subscriber may include objects of relevance such as balls, pucks, birdies, players, movement of humans. In another example, if a second subscriber watches a lot of nature documentaries, then one or more of the subscriber profiles 282 related to the second subscriber may include objects of relevance such as flora, fauna, vistas, and views.

A user may update the data store 280 by interacting with the UPAV module 264 through a computing device 290. For example, computing device 290 may be a tablet that includes a user interface capable of selecting input from a subscriber. A subscriber may input information such as likes and dislikes, preferences, viewing history, and contacts (including names and pictures). Based on the input, the UPAV module 264 may generate a profile (e.g., profile 282-2 for a given user). A user may also passively update a profile on data store 280. For example, UPAV module 264 may be configured to execute partially or wholly on user device 290. The UPAV module 264 may retrieve, based on usage of the user, historic and real-time viewing preferences of the user.

The CAP module 266 may be software, hardware, or some combination running on circuits of one or more computers. For example, FIG. 5 depicts an example computer system 500 consistent with some embodiments, that can execute CAP module 266. The CAP module 266 may be a single software or hardware component. In some embodiments, CAP module may include multiple components. For example, it may include a COS efficiency analyzer module (not depicted) and a dynamic COS profiler module (not depicted). The COS efficiency analyzer module may receive viewing preferences from the UPAV module 264. The COS efficiency analyzer module may also receive prioritized details of detected objects from the CAPP 260 module. The COS efficiency analyzer module may also receive network performance details from the network analysis module 262.

The COS efficiency analyzer module of the CAP module 266 may be configured to receive the prioritized pixel details, user's viewing preference details, and network performance details. The COS efficiency analyzer module may further be configured to analyze or determine the viewing preference of the user and the network performance constraints and may determine the priority of the pixels and the appropriate COS profile. The COS efficiency analyzer module may further generate a network profile suitable for a particular video stream image and provide that input to the dynamic COS profiler module.

The dynamic COS profiler module of the CAP module 266 may be configured to group the prioritized pixels in the data packets. The grouping may include setting a high priority for the COS profile of data packets which would be consumed by the communication channel and ensures that those data packets are handled with the subscribed COS level SLA (e.g., avoiding network-based issues or delays). For example, CAP module 266 may generate an instance 200-1 of video stream 200 based on the various priorities of pixels, such as increased priority for pixels representative of object 210-2. Based on the heterogenous COS profile of instance 200-1, network 270 may deliver instance 200-1 to devices (e.g., device 290) with pixels having different qualities based on the priority of pixels. For example, different classes would have different bandwidth, latency, jitter, packet loss, resiliency, or other degradation (including no degradation). Consequently, the group of pixels constituting an object with a higher class may follow a different virtual channel with a better service level agreement (SLA) value whereas other pixels may follow lower SLA channels. Performance monitoring service assurance systems also would not track the low SLA pixels.

The object identification and criticality association can be static or can be done at run time based on attributes pertaining to the user. For example, editors, service providers, content creators, or other relevant users may provide input to the CACOS system 250. The input may be used to identify important areas or regions including objects (e.g., objects 210 of video stream 200) to generate various COS prioritizations of network packets corresponding to the criticality of pixels. For example, actor 210-2 may be set as the default critical area of video stream 200. Just before or during transmission through network 270, video stream 200 may be adjusted. For example, UPAV module 264 may constantly monitor the viewing patterns of a user that receives video stream 200 (e.g., instance 200-1). Upon a change in the preference/viewing pattern, cognitive COS management 250 system may determine the impact of the change and decide on altering the COS profile in real time to benefit the user based on an appropriate COS profile of the user.

The CACOS system 250 may operate to generate multiple instances of a video stream that are different from each other and tailored to various subscribers. For example, a first user (not depicted) may be associated with profile 282-1. Based on profile 282-1 actor 210-2 may be assigned as critical pixels of pixels 220 of video stream 200. CACOS system 250 may render instance 200-1 of video stream 200 by placing pixels that correlate with actor 210-2 into packets for delivery to first user with a higher COS profile. In a second example, a second user (not depicted) may be associated with profile 282-2. Based on profile 282-2, tree 210-3 may be assigned as critical pixels of pixels 220 of video stream 200. CACOS system 250 may render a second instance (not depicted) of video stream 200 by placing pixels that correlate with the tree 210-3 into packets for delivery to second user with a higher COS profile. In both the first example and the second example, the CACOS system 250 may provide benefits in that both the first user and second user video streams are of high quality to each of them even during times of network congestion or partial packet loss.

Figure 3:
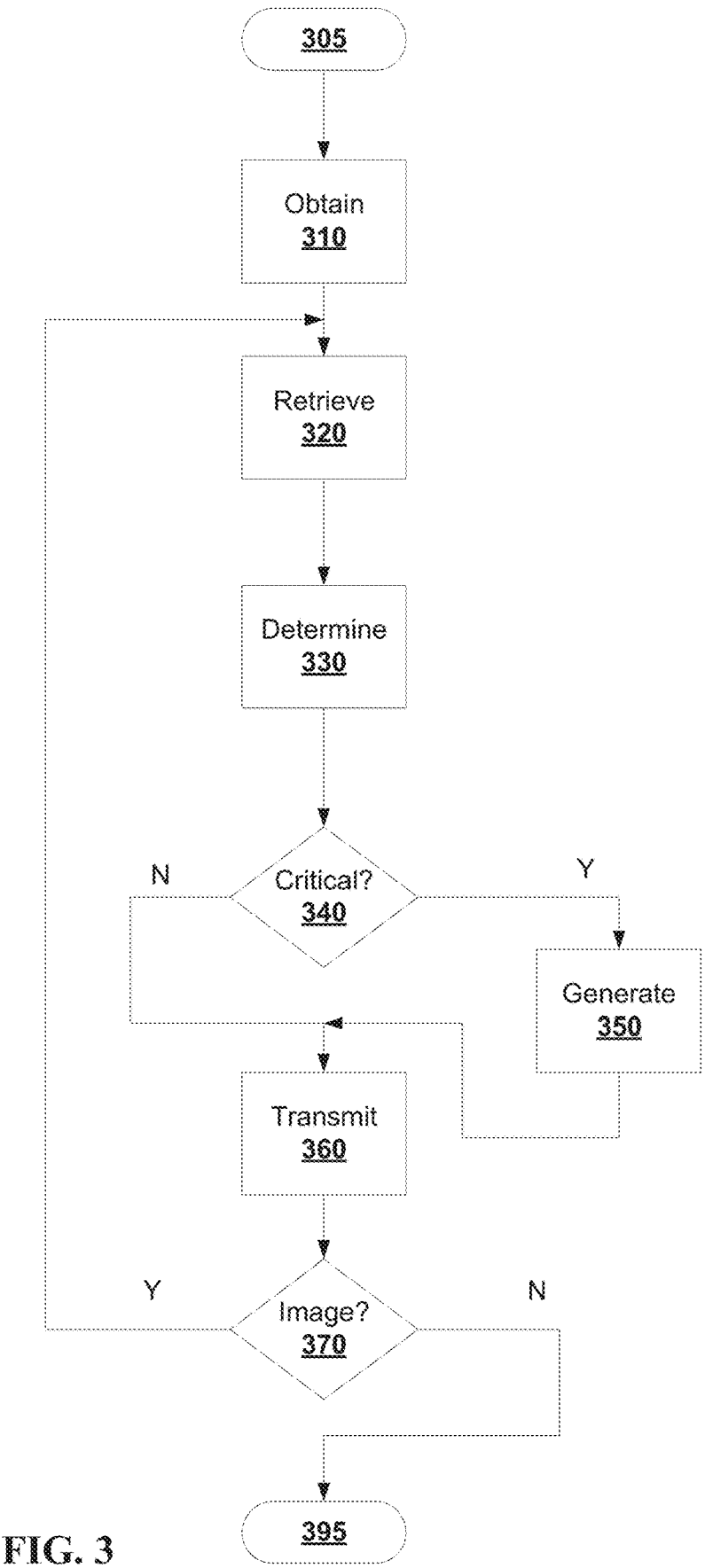
FIG. 3 depicts an example method of performing content aware class of service consistent with some embodiments of the disclosure.

FIG. 3 depicts an example method 300 of performing content aware class of service consistent with some embodiments of the disclosure. Method 300 may include more or less operations than depicted in FIG. 3. Method 300 may be performed by a computer system, such as a smartphone, a tablet, a personal computer of an end user, a server of a service provider, or other relevant computer. Certain operations of method 300 may be performed by a first computer and a second computer. FIG. 5 depicts a computer system 500 capable of performing one or more operations of method 300. Method 300 may be performed continuously or substantially contemporaneously (e.g., every second, every 16.6 milliseconds, every 100 milliseconds).

From start 305, method 300 begins by obtaining a video stream at 310. The video stream may be stored on a server or other computer. The video stream may contain a series of video stream images, such as fields, frames, or pictures. The video stream may be obtained by intercepting packets of the video stream (e.g., data packets, network packets). Intercepting of the packets may include removing the packets from a cache, buffer, or network stream before they are delivered to a user. The video stream may be obtained just before, or substantially contemporaneously with, being sent to one or more subscribers. In some embodiments, the video stream may be obtained substantially before (e.g., minutes, hours, weeks) being sent to subscribers. For example, the video stream may be obtained just after being authored by a content provider or stored by a service provider. A content provider may identify out of one hundred fifty objects in a movie, there are fifteen high priority, forty medium priority, and sixty low priority objects.

Based on obtaining the video stream, non-pixel data may be retrieved at 320. The non-pixel data may be stored in a data store associated with the video stream. In some embodiments, the non-pixel data may be stored in a metadata of the video stream. The non-pixel data may be related to one or more users. For example, the non-pixel data may be related to one or more users that subscribe to the video stream (subscribers). The non-pixel data may include user preferences and method 300 may include retrieving or collecting user preferences from users.

Non-pixel data may be related to content within the video stream. For example, method 300 may further include detecting a plurality of objects a video stream image of the video stream. Further, a critical portion of the video stream image may be identified based on the plurality of detected objects or by analyzing the one or more detected objects (e.g., performing feature analysis, performing edge detection). Based on a critical portion being identified, new non-pixel data may be created. In some embodiments, existing non-pixel data may be updated. For example, a second critical portion may be identified within the video stream image by analyzing one or more detected objects within the video stream. Further, the non-pixel data may be updated based on the second critical portion.

At 330 one or more critical objects within the video stream image of the video stream may be determined. The determination may include analyzing or scanning the pixels of a given video stream image. The one or more critical objects may be represented by a plurality of pixels located within a video stream image. Further, the determination may include performing one or more feature or object detection algorithms or other relevant analysis algorithms. Determining of one or more critical objects at 330 may be performed repeatedly. This may occur, for example, by determining a first critical object during a first execution of 330 and determining a second critical object during a second execution of 330.

Determining the one or more critical objects may include filtering out critical objects from one or more features or objects that are detected. Determining the one or more critical objects may include selecting objects of the non-pixel data (e.g., from an identified critical portion of a video stream image). Determining the one or more critical objects in a video stream image may be based on the type of video stream that was obtained. For example, it may be based on a genre or other metadata of the video stream of the video stream image. Determining the one or more critical objects may be based on user profiles. For example, based on a first profile related to a subscriber of the video stream, a first critical object may be determined. In another example, based on a second profile related to a second subscriber of the video stream, a second critical object may be determined.

If a critical portion is determined in a video stream image, at 340, a prioritization of one or more network packets is generated at 350. The prioritization may include a class of service value (e.g., '2', '4', or '5') for a packet that contains the plurality of pixels that represent the one or more critical objects of the video stream image. The prioritization may be an increase in the class of service value. For example, a class of service value for a first packet that contains a first plurality of pixels may be '3' and the prioritization may be an updated value of '4' for the first packet. The prioritization may be a decrease in the class of service value. For example, a class of service value for a second packet that contains a second plurality of pixels may be '3' and the prioritization may be an updated value of '4' for the second packet. The generated prioritization may not be directed at the entirety of a video stream image (e.g., updating a class of service value for a subset of one or more but less than all of the pixels of the video stream image). Generating the prioritization may be based on a user, such as based on a subscriber profile of a first user.

After generating a prioritization, at 340 (or after there is no critical portion determined at 340), updates to the packets may be transmitted at 360. Transmitting of the packets may include reinserting any intercepted packets of the video stream image. Transmitting may also include rewriting or updating packets that represent the video stream image with the updated class of service. If there is another video stream image within the video stream, at 370, method 300 may continue. For example, by retrieving any non-pixel data of a next video stream image at 320. Further, one or more critical objects within the next video stream image of the video stream may be determined. Further, conditionally a second prioritization of packets of the next video stream image may be generated. If there is not another video stream image within the video stream, at 370, method 300 ends at 395.

Figure 4:
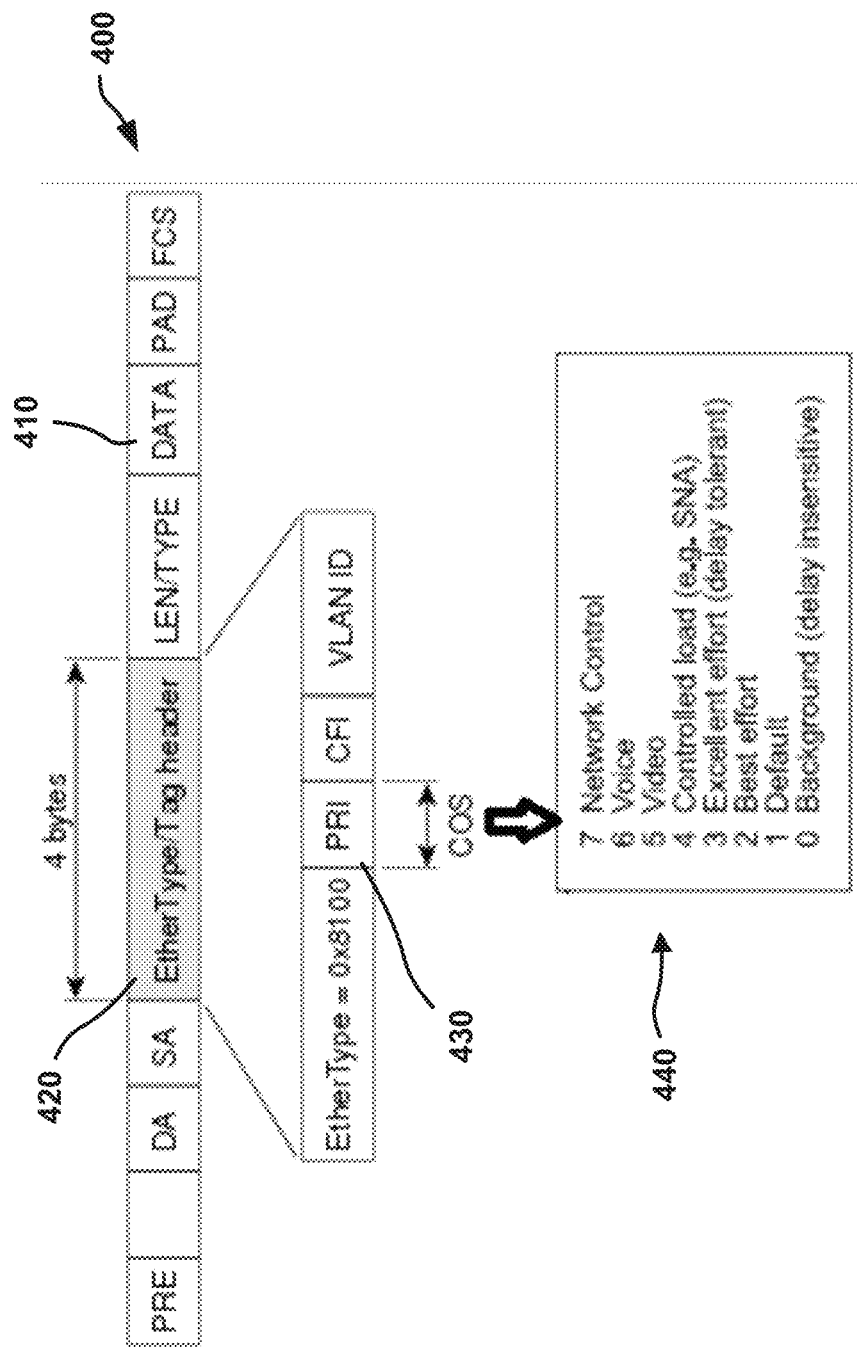
FIG. 4 depicts an example data packet to be modified consistent with some embodiments of the disclosure.

FIG. 4 depicts an example data packet 400 to be modified consistent with some embodiments of the disclosure. Data packet 400 may include a data field 410 and a type field 420. The data field 410 may be a location understood by computer systems that exchange packets as carrying a payload of data. Consistent with the disclosure, data field 410 may contain pixels (e.g., pixel values) representative of a certain area, portion, or section of a video stream image.

The type field 420 may be a tag, area, field, or other understood region of packet 400 that represents the type of packet that makes up data packet 400. For example, type field 420 may be an ethernet or ethertype field, and type field 420 may communicate to computer systems that packet 400 is to be delivered to another computer system.

Type field 420 may also include a class of service sub-field 430. The class of service sub-field 430 may be set by various computers and network hardware for prioritization. The class of service sub-field 430 may be a tag, area, bit, bits, field, or other understood region of type field 420. Systems or computers configured to operate on, generate, or update packets consistent with a CACOS may operate by updating the class of service sub-field 430 on packets at a per object or per pixel level.

In some embodiments, CACOS may operate by increasing or raising the COS profiles within data packets (e.g., data packet 400). For example, a video stream before CACOS processing may include a video stream in packets all having a COS value 440 of '3' representative of all pixels of the video stream. The CACOS processing may operate to modify a subset of packets (e.g., one or more packets) of the video stream to be a COS value 440 of '5' representative of pixels that correspond to a critical area of the video stream. This may improve performance of playback of the video stream for users and may improve performance of the network infrastructure hosting the packets of the video stream, for example, by increasing the network priority for the subset of packets, which may enable certain packets to be prioritized and delivered more rapidly.

In some embodiments, CACOS may operate by decreasing or lowering the COS profiles within data packets. For example, a video stream before CACOS processing may include a video stream with packets all having a COS value 440 of '4' representative of all pixels of the video stream. The CACOS processing may operate to modify a subset of packets of the video stream to be a COS value 440 of '2' representative of pixels that do not correspond to a critical area of the video stream (e.g., not a critical area of the video stream, non-critical pixels, irrelevant data, reduced priority of one or more pixels). This may improve performance of playback of the video stream for users and may improve performance of the network infrastructure hosting the packets of the video stream. For example, by reducing the network priority for a subset of packets of the video stream, which may reduce bandwidth usage of the network.

FIG. 5 depicts the representative major components of an example computer system 500 (alternatively, computer) that may be used, in accordance with some embodiments of the present disclosure. It is appreciated that individual components may vary in complexity, number, type, and\or configuration. The particular examples disclosed are for example purposes only and are not necessarily the only such variations. The computer system 500 may comprise a processor 510, memory 520, an input/output interface (herein I/O or I/O interface) 530, and a main bus 540. The main bus 540 may provide communication pathways for the other components of the computer system 500. In some embodiments, the main bus 540 may connect to other components such as a specialized digital signal processor (not depicted).

The processor 510 of the computer system 500 may be comprised of one or more cores 512A, 512B, 512C, 512D (collectively 512). The processor 510 may additionally include one or more memory buffers or caches (not depicted) that provide temporary storage of instructions and data for the cores 512. The cores 512 may perform instructions on input provided from the caches or from the memory 520 and output the result to caches or the memory. The cores 512 may be comprised of one or more circuits configured to perform one or more methods consistent with embodiments of the present disclosure. In some embodiments, the computer system 500 may contain multiple processors 510. In some embodiments, the computer system 500 may be a single processor 510 with a singular core 512.

The memory 520 of the computer system 500 may include a memory controller 522. In some embodiments, the memory 520 may comprise a random-access semiconductor memory, storage device, or storage medium (either volatile or non-volatile) for storing data and programs. In some embodiments, the memory may be in the form of modules (e.g., dual in-line memory modules). The memory controller 522 may communicate with the processor 510, facilitating storage and retrieval of information in the memory 520. The memory controller 522 may communicate with the I/O interface 530, facilitating storage and retrieval of input or output in the memory 520.

The I/O interface 530 may comprise an I/O bus 550, a terminal interface 552, a storage interface 554, an I/O device interface 556, and a network interface 558. The I/O interface 530 may connect the main bus 540 to the I/O bus 550. The I/O interface 530 may direct instructions and data from the processor 510 and memory 520 to the various interfaces of the I/O bus 550. The I/O interface 530 may also direct instructions and data from the various interfaces of the I/O bus 550 to the processor 510 and memory 520. The various interfaces may include the terminal interface 552, the storage interface 554, the I/O device interface 556, and the network interface 558. In some embodiments, the various interfaces may include a subset of the aforementioned interfaces (e.g., an embedded computer system in an industrial application may not include the terminal interface 552 and the storage interface 554).

Logic modules throughout the computer system 500—including but not limited to the memory 520, the processor 510, and the I/O interface 530—may communicate failures and changes to one or more components to a hypervisor or operating system (not depicted). The hypervisor or the operating system may allocate the various resources available in the computer system 500 and track the location of data in memory 520 and of processes assigned to various cores 512. In embodiments that combine or rearrange elements, aspects and capabilities of the logic modules may be combined or redistributed. These variations would be apparent to one skilled in the art.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
  detecting, before a video stream is sent to one or more subscribers and before the video stream is viewed by any user, a plurality of objects in at least one video stream image of a video stream, wherein the detecting the plurality objects includes performing machine learning based image analysis on pixels that visually represent each video stream image of the video stream, wherein the video stream is part of a teleconference;
  identifying, based on the detecting the plurality of objects in the at least one video stream image, a critical portion of the at least one video stream image;
  creating, based on the identifying the critical portion, a first non-pixel data;

obtaining the video stream to be sent to one or more subscribers, the video stream including the at least one video stream image;

retrieving, based on the obtaining the video stream and before providing the video stream to the one or more subscribers, the first non-pixel data, wherein the first non-pixel data includes viewing history of other video streams;

determining, based on the obtaining the video stream and based on the first non-pixel data, a first critical object in the video stream, wherein the first critical object is represented by a first plurality of pixels, the first plurality of pixels located within the at least one video stream image, wherein the first plurality of pixels define a critical region of the video stream image that contains the first critical object and has a smaller displayable region than the video stream image, wherein the determining includes performing a machine learning model on the video stream image to analyze the critical objects in the video stream image; and generating, based on the determining the first critical object in the video stream, a first prioritization of one or more network packets that correspond to the first plurality of pixels of the video stream image, wherein the one or more network packets contain the first plurality of pixels that depict the first critical object in the video stream image, and wherein the first plurality of pixels that define the region is less than an entirety of the pixels of the video stream image, wherein generating the first prioritization includes setting an adjusted class of service value for the one or more network packets, and wherein the one or more network packets are transmitted based on the adjusted class of service value.

2. The method of claim 1, wherein the non-pixel data includes a first subscriber profile related to a first subscriber of the one or more subscribers.

3. The method of claim 2, wherein the non-pixel data includes a second subscriber profile related to a second subscriber of the one or more subscribers, and wherein the method further comprises:

determining, based on the obtaining the video stream and based on the non-pixel data that includes the second subscriber profile, a second object in the video stream, wherein the second object is represented by a second plurality of pixels, the second plurality of pixels located within the at least one video stream image; and generating, based on determining the second object in the video stream, a second prioritization of an additional one or more network packets of the video stream, wherein the additional one or more network packets contain the second plurality of pixels.

4. The method of claim 1 further comprising:

identifying, based on the detecting the plurality of objects in the at least one video stream image, a second critical portion of the at least one video stream image; and updating, based on the identifying the second critical portion, the first non-pixel data.

5. The method of claim 1, wherein the creating the first non-pixel data is further based on one or more metadata, the one or more metadata retrieved from the video stream.

6. The method of claim 1, wherein the video stream includes a second video stream image, and wherein the method further comprises:

determining, based on the obtaining the video stream and based on the non-pixel data, that the first critical object in the video stream is also represented by a second plurality of pixels, the second plurality of pixels located within the second video stream image; and generating, based on determining that the first critical object is also represented by the second plurality of pixels, a second prioritization of an additional one or more network packets of the video stream, wherein the additional one or more network packets contain the second plurality of pixels.

7. The method of claim 1, wherein the method further comprises:

determining, based on the obtaining the video stream and based on the non-pixel data, a second object in the video stream, wherein the second object is represented by a second plurality of pixels, the second plurality of pixels located within the at least one video stream image; and generating, based on the determining the second object in the video stream, a second prioritization of an additional one or more network packets of the video stream, wherein the one or more second network packets contain the second plurality of pixels.

8. The method of claim 1 further comprising:

altering, based on the first prioritization, the class of service of the one or more network packets.

9. The method of claim 8, wherein the altering includes increasing the network priority of the one or more network packets.

10. A system, the system comprising:

a memory, the memory containing one or more instructions; and a processor, the processor communicatively coupled to the memory, the processor, in response to reading the one or more instructions, configured to:

detect, before a video stream is sent to one or more subscribers and before the video stream is viewed by any user, a plurality of objects in at least one video stream image of a video stream, wherein the detecting the plurality objects includes performing machine learning based image analysis on pixels that visually represent each video stream image of the video stream, wherein the video stream is part of a teleconference;

identify, based on the detecting the plurality of objects in the at least one video stream image, a critical portion of the at least one video stream image;

create, based on the identifying the critical portion, a first non-pixel data;

obtain the video stream to be sent to one or more subscribers, the video stream including the at least one video stream image;

retrieve, based on the obtaining the video stream and before providing the video stream to the one or more subscribers, the first non-pixel data, wherein the first non-pixel data includes viewing history of other video streams;

determine, based on the obtaining the video stream and based on the first non-pixel data, a first critical object in the video stream, wherein the first critical object is represented by a first plurality of pixels, the first plurality of pixels located within the at least one video stream image, wherein the first plurality of pixels define a region of the video stream image that contains the first critical object, wherein the determining includes performing an image analysis technique on the video stream image; and generate, based on the determining the first critical object in the video stream, a first prioritization of one or more network packets that correspond to the first plurality of pixels of the video stream image, wherein the one or more network packets contain the first plurality of pixels that depict the first critical object in the video stream image, and wherein the first plurality of pixels that define the region is less than an entirety of the pixels of the video stream image, wherein generating the first prioritization includes setting an adjusted class of service value for the one or more network packets, and wherein the one or more network packets are transmitted based on the adjusted class of service value.

11. The system of claim 10, wherein the non-pixel data includes a first subscriber profile related to a first subscriber of the one or more subscribers.

12. The system of claim 11, wherein the non-pixel data includes a second subscriber profile related to a second subscriber of the one or more subscribers, and wherein the processor is further configured to:

determine, based on the obtaining the video stream and based on the non-pixel data that includes the second subscriber profile, a second object in the video stream, wherein the second object is represented by a second plurality of pixels, the second plurality of pixels located within the at least one video stream image; and generate, based on the determining the second object in the video stream, a second prioritization of an additional one or more network packets of the video stream, wherein the additional one or more network packets contain the second plurality of pixels.

13. The system of claim 10, wherein the processor is further configured to:

identify, based on the detecting the plurality of objects in the at least one video stream image, a second critical portion of the at least one video stream image; and update, based on the identifying the second critical portion, the first non-pixel data.

14. A computer program product, the computer program product comprising a computer readable storage medium having program instructions embodied therewith, the program instructions configured to:

detect, before a video stream is sent to one or more subscribers and before the video stream is viewed by any user, a plurality of objects in at least one video stream image of a video stream, wherein the detecting the plurality objects includes performing machine learning based image analysis on pixels that visually represent each video stream image of the video stream, wherein the video stream is part of a teleconference;

identify, based on the detecting the plurality of objects in the at least one video stream image, a critical portion of the at least one video stream image;

create, based on the identifying the critical portion, a first non-pixel data;

obtain the video stream to be sent to one or more subscribers, the video stream including the at least one video stream image;

retrieve, based on the obtaining the video stream and before providing the video stream to the one or more subscribers, the first non-pixel data, wherein the first non-pixel data includes viewing history of other video streams;

determine, based on the obtaining the video stream and based on the first non-pixel data, a first critical object in the video stream, wherein the first critical object is represented by a first plurality of pixels, the first plurality of pixels located within the at least one video stream image, wherein the first plurality of pixels define a region of the video stream image that contains the first critical object, wherein the determining includes performing an image analysis technique on the video stream image; and generate, based on the determining the first critical object in the video stream, a first prioritization of one or more network packets that correspond to the first plurality of pixels of the video stream image, wherein the one or more network packets contain the first plurality of pixels that depict the first critical object in the video stream image, and wherein the first plurality of pixels that define the region is less than an entirety of the pixels of the video stream image, wherein generating the first prioritization includes setting an adjusted class of service value for the one or more network packets, and wherein the one or more network packets are transmitted based on the adjusted class of service value.

15. The computer program product of claim 14, wherein the video stream includes a second video stream image, and wherein the program instructions are further configured to:

determine, based on the obtaining the video stream and based on the non-pixel data, the first critical object in the video stream is also represented by a second plurality of pixels, the second plurality of pixels located within the second video stream image; and generate, based on determining that the first critical object is also represented by the second plurality of pixels, a second prioritization of an additional one or more network packets of the video stream, wherein the additional one or more network packets contain the second plurality of pixels.

16. The computer program product of claim 14, wherein the program instructions are further configured to:

determine, based on the obtaining the video stream and based on the non-pixel data, a second object in the video stream, wherein the second object is represented by a second plurality of pixels, the second plurality of pixels located within the at least one video stream image; and generate, based on the determining the second object in the video stream, a second prioritization of an additional one or more network packets of the video stream, wherein the additional one or more network packets contain the second plurality of pixels.

17. The computer program product of claim 14, wherein the program instructions are further configured to:

alter, based on the first prioritization, the class of service of the one or more network packets.

18. The computer program product of claim 17, wherein the altering includes increasing the network priority of the one or more network packets.

* * * * *